C. AINSWORTH.
Elevator for Harvester.

No. 216,126. Patented June 3, 1879.

Witnesses: Inventor:
J. W. Garner C. Ainsworth,
per
F. A. Lehmann,
Atty

N. PETERS, PHOTO-LITHOGRAPHER, WASHINGTON, D. C.

UNITED STATES PATENT OFFICE.

CLARK AINSWORTH, OF MONTICELLO, IOWA.

IMPROVEMENT IN ELEVATORS FOR HARVESTERS.

Specification forming part of Letters Patent No. 216,126, dated June 3, 1879; application filed April 23, 1879.

*To all whom it may concern:*

Be it known that I, CLARK AINSWORTH, of Monticello, in the county of Jones and State of Iowa, have invented certain new and useful Improvements in Elevators for Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in elevators for harvesters; and it consists in the arrangement and combination of parts, whereby the upper portion of the elevator is entirely disconnected from and moves independently of the lower portion, so as to regulate itself automatically to the amount of straw or other substance passing through between the two parts of the elevator, and between the lower end of the upper part and the apron on the platform, as will be more fully described hereinafter.

Figure 1:
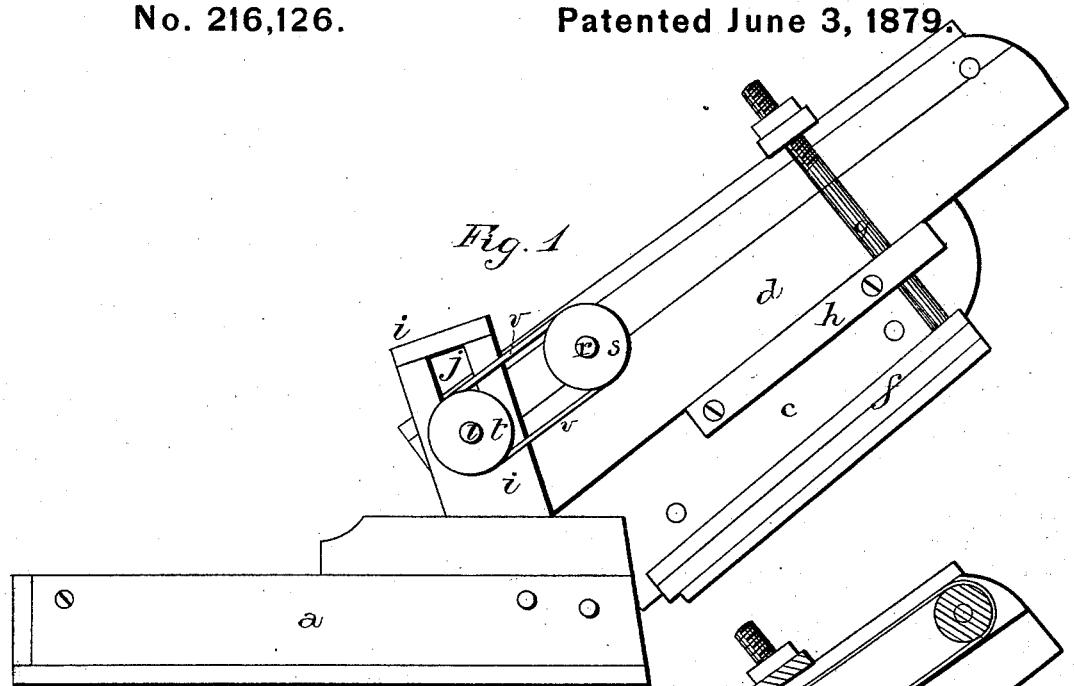
Figure 2:
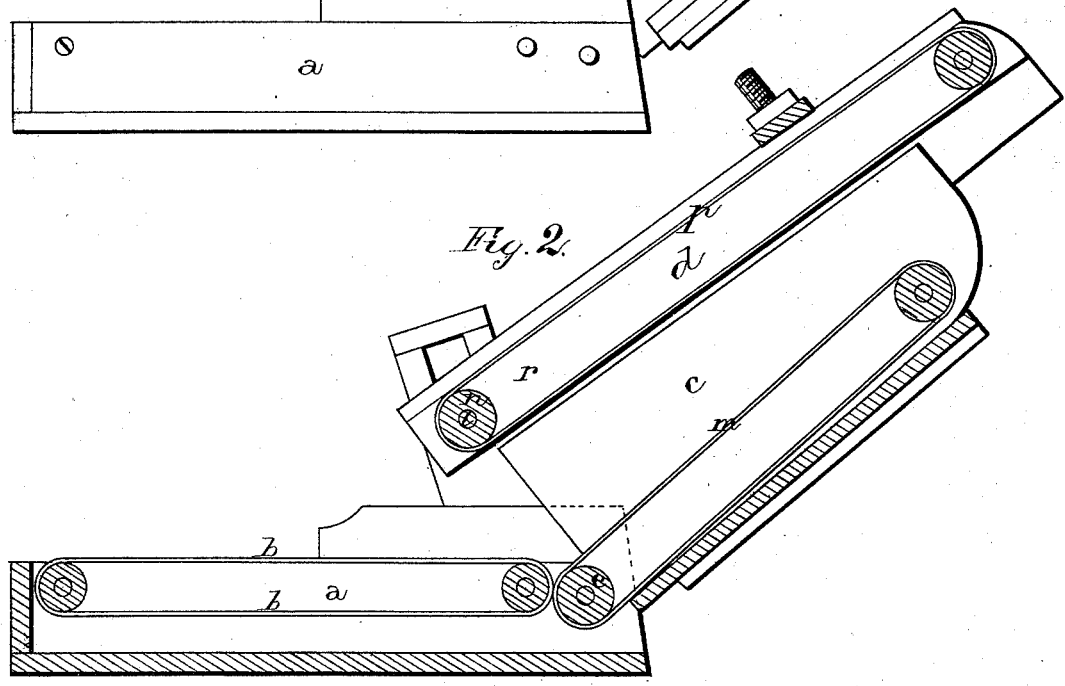
Figure 3:
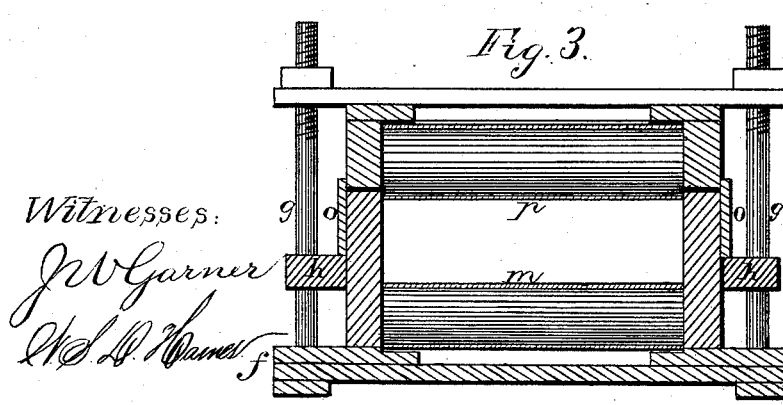

Figure 1 is a side elevation of my invention. Fig. 2 is a vertical longitudinal section, and Fig. 3 is a vertical cross-section, of the same.

$a$ represents the bed-frame of the platform, which is provided with the endless apron $b$, for moving the straw or other substance toward the elevator. This elevator consists of two portions, $c$ $d$, the lower one of which is pivoted upon the shaft of the lower roller, $e$, and the two parts are adjustable up and down in the usual manner.

The bottom of the lower portion, $c$, projects out on each side, so as to form a support, $f$, for the rod $g$, which passes up through the perforated brace or guide $h$ on the upper edge of the part $c$. There is one of these rods $g$ on each side of the elevator, and they extend up some distance beyond the top of the upper portion, $d$, and have a stop attached to them extending across the top of the portion $d$, so as to prevent it from rising too high or falling over on the platform when the elevator is raised up high. As the ends of these rods are screw-threaded and provided with nuts, the distance the upper portion shall rise can be readily adjusted. To this stop is also fastened the rope or chain which holds the elevator in position.

Upon the top of the inner end of the bed-frame are the two inclined slotted uprights $i$, in which the boxes $j$ move freely up and down; and in these boxes is journaled the shaft $l$ of the lower roller, $n$, of the upper part of the elevator. The part $d$ is pivoted on this shaft $l$, and is entirely disconnected from and moves back and forth over the top of the lower portion, $c$, without being in any manner fastened to it. The lower portion, besides carrying the lower elevator-apron, $m$, serves as a support for the upper portion, $d$, and the two parts are always in contact unless the amount of straw being carried up between the lower apron, $m$, and the upper apron, $p$, is great enough to force the two portions apart.

In order to prevent the straw that is passing up through the elevator into a wagon or stack from passing out through between the edges of the two portions $c$ $d$ the flanges $o$ are used, which may be attached to either portion, and which will close this joint, as shown.

In the lower end of the upper part, $d$, is journaled a second roller, $r$, and on one end of its shaft is placed a pulley, $s$, which is connected to the pulley $t$ on the shaft $l$ by means of a band or chain, $v$. The power of the driving mechanism will be applied to the end of the shaft on which the pulley $s$ is placed by means of a tumbling-rod, and this motion will be transmitted to the shaft $l$, thereby enabling the elevator to be adjusted at will without having to change the length of any of the belts. By thus having the upper part of the elevator made separate from and independent of the lower part in its movement, the upper part adapts itself automatically to the amount of grain passing through it, and hence the two elevating-aprons will never clog and cease to work.

Having thus described my invention, I claim—

1. An elevator for harvesters composed of the two parts $c$ $d$, the upper part, $d$, being pivoted upon the platform and resting upon the lower part, $c$, but entirely disconnected therefrom, whereby the upper part, $d$, can automatically adjust itself to the amount of grain passing through the elevator, substantially as described.

2. In an elevator for harvesters, the combination of the bed-frame $a$, provided with the slotted standards $i$, with the elevator composed of the two parts $c\ d$, the lower roller, $n$, of the upper part, $d$, having its shaft journaled in boxes that move in the slots $j$, and the upper part of the elevator being entirely disconnected from the lower part, upon which it rests, substantially as shown.

3. In an elevator for harvesters, the combination of the lower part, $c$, pivoted in the end of the bed-frame, with the upper part, $d$, pivoted in the standards on top of the bed-frame, rods $g$, and a stop, whereby the upper part, $d$, can automatically adjust itself both vertically and longitudinally upon the lower part, $c$, substantially as set forth.

In testimony that I claim the foregoing I have hereunto set my hand this 8th day of April, 1879.

CLARK AINSWORTH.

Witnesses:
 H. D. SHERMAN,
 D. V. GARDNER.